United States Patent
Chini et al.

(10) Patent No.: US 9,258,105 B2
(45) Date of Patent: *Feb. 9, 2016

(54) ETHERNET PHYSICAL LAYER DEVICE USING TIME DIVISION DUPLEX

(71) Applicant: Broadcom Corporation, Irvine, CA (US)

(72) Inventors: Ahmad Chini, Mission Viejo, CA (US); Mehmet Vakif Tazebay, Irvine, CA (US); Scott Powell, Alisa Viejo, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/613,491

(22) Filed: Feb. 4, 2015

(65) Prior Publication Data

US 2015/0146590 A1 May 28, 2015

Related U.S. Application Data

(63) Continuation of application No. 13/300,996, filed on Nov. 21, 2011, now Pat. No. 9,001,714.

(60) Provisional application No. 61/531,184, filed on Sep. 6, 2011.

(51) Int. Cl.
*H04L 5/14* (2006.01)
*H04L 12/403* (2006.01)

(52) U.S. Cl.
CPC .......... *H04L 5/1469* (2013.01); *H04L 12/4035* (2013.01); *H04L 5/1423* (2013.01)

(58) Field of Classification Search
None
See application file for complete search history.

(56) References Cited

U.S. PATENT DOCUMENTS

| 4,507,778 A | 3/1985 | Tan |
| 8,064,373 B2 | 11/2011 | Diab et al. |
| 2006/0092967 A1* | 5/2006 | Bergeron et al. ............. 370/463 |

FOREIGN PATENT DOCUMENTS

| KR | 10-2003-00844533 | 11/2003 |
| TW | 576028 | 2/2004 |
| TW | 201119436 A1 | 6/2011 |

OTHER PUBLICATIONS

IEEE 802.16, Physical Layer Proposal based on a Time Division Duplex/Time Division Multiple Acess (TDD/TDMA) Frame Structure.*
Buchholz et al., Wireless In-Building Network Architecture and Protocols, IEEE Network Magazine, Nov. 1991.
European Search Report, Nov. 20, 2012.
KIPO Office Action, Aug. 8, 2013.
TW Office Action, Jun. 23, 2014.
CN Office Action, Jan. 6, 2015.
TW Office Action, Jan. 8, 2015.
IEEE 802.16 Broadband wireless access working group, 1999.
Office Action for Chinese Patent Application No. 2012103287413 mailed Aug. 13, 2015 (including English summary).

* cited by examiner

*Primary Examiner* — Thai Nguyen
(74) *Attorney, Agent, or Firm* — Foley & Lardner LLP; Christopher J. McKenna; Helen H. Zhang

(57) ABSTRACT

An Ethernet physical layer device using time division duplex. A time division duplex frame can be defined with uplink and downlink transmission periods. These defined uplink and downlink transmission periods can be adjusted based on bandwidth and latency considerations on the network link.

18 Claims, 4 Drawing Sheets

ETHERNET PHYSICAL LAYER DEVICE USING TIME DIVISION DUPLEX

This application is a continuation of non-provisional patent application Ser. No. 13/300,996, filed Nov. 21, 2011, which claims priority and benefit of provisional patent application No. 61/531,184, filed Sep. 6, 2011. Each of the above-identified applications is incorporated by reference herein, in its entirety, for all purposes.

BACKGROUND

1. Field of the Invention

The present invention relates generally to Ethernet physical layer devices and, more particularly, to an Ethernet physical layer device using time division duplex.

2. Introduction

Ethernet is one of the most successful and long lasting designs for data communications over wired networks. Ethernet physical layer device (PHY) specifications have evolved significantly. The most recent formats for 10 Mbps and 100 Mbps Ethernet PHYs use two pairs of twisted cables, while for 1 Gbps, four pairs of twisted cables are used as specified in the IEEE 802.3 standard.

In the existing telephony wirings, a single twisted pair is often available. The wirings may be tapped to provide services at multiple points. These tapped wires, which are commonly referred to as "bridged taps," cause strong reflections or echoes affecting signal quality. Coaxial cable networks, which are mainly used for TV signal distribution, are also single pair. These coaxial cables, which are often tapped using splitters for multi-room services, cause strong reflections.

What is needed therefore is a mechanism for sending standard Ethernet data packets over a single-pair cable in a manner that can leverage integrated mixed signal silicon devices and signal processing techniques developed for existing Ethernet PHYs.

SUMMARY

An Ethernet physical layer device using time division duplex, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The IEEE standard Ethernet PHY for a 100 Mbps link uses two pairs of wires. Extension of this 100 Mbps Ethernet link to a single-pair wire would include the use of echo-cancellation techniques. Unfortunately, these echo-cancellation techniques are typically limited to cables with controlled signal reflections for a receiver with a given dynamic range. As would be appreciated, there are some cabling situations where the return signal is not under control. One example of this type of cabling situation is telephony wiring with bridged taps.

In the present invention, it is recognized that time division duplex (TDD) can be applied to existing Ethernet PHYs, thereby allowing two-way, point-to-point communications over a single-pair cable. Here, it is a feature of the present invention that combining TDD with modulation and signal processing formats native to Ethernet would allow high-throughput Ethernet packet transmission that reuses the existing digital and analog blocks in higher-speed Ethernet PHYs. As would be appreciated, the need for high-resolution, echo-cancellation methods is obviated as this format of communication is immune to large signal reflections.

As will be described in greater detail below, the application of TDD to Ethernet PHYs allows for programmable symmetric and asymmetric throughput in the uplink and the downlink. It also allows for higher power efficiency and lower radio emission. It should also be noted that while the description below is primarily in the context of two-way communications over a single-pair cable, the principles of the present invention may be used over multi-pair cables given other inherent benefits.

Figure 1:
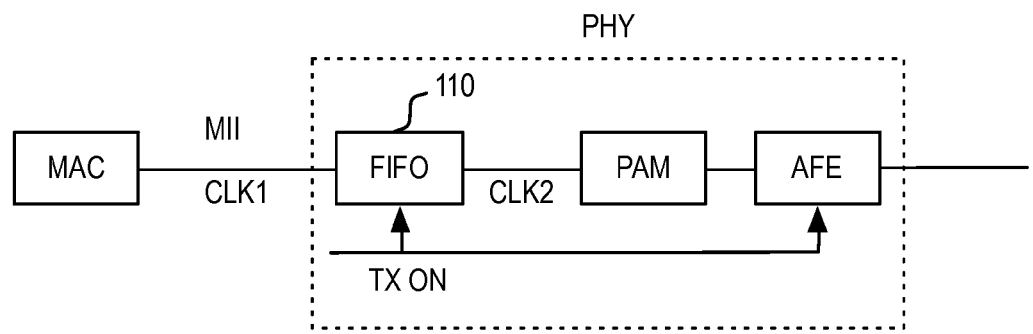
FIG. 1 illustrates a transmit block diagram of a time division duplex Ethernet PHY.
Figure 2:
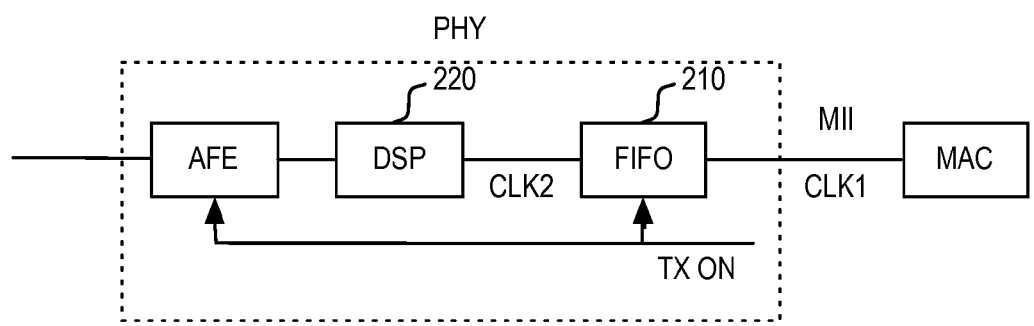
FIG. 2 illustrates a receive block diagram of a time division duplex Ethernet PHY.

FIGS. 1 and 2 show simplified transmit and receive block diagrams, respectively, of a TDD Ethernet PHY. In one embodiment, collision (COL) and carrier sense (CRS) signals can be used at the MII interface to control medium availability, thereby allowing standard half-duplex operation. While this mechanism may work well in many cases, it may not provide full bandwidth utilization of the system and could result in increased latency. It should be noted that with half-duplex connection to the MAC, the use of FIFO buffers are not necessary, although they can improve the link throughput.

In the alternative embodiment illustrated in FIGS. 1 and 2, FIFO buffers 110, 120 used at the MII interface has CLK2 faster than CLK1. If CLK2 is fast enough and the FIFO buffer 110, 120 is properly sized, then the channel is always available at the MAC interface, thereby allowing for full-duplex operation.

Figure 3:
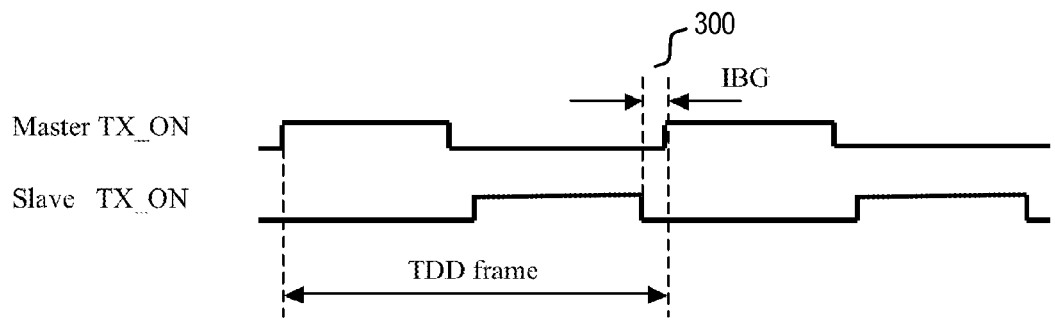
FIG. 3 illustrates transmitter activity with symmetric downlink and uplink throughput.

With TDD, the medium is shared between the uplink and the downlink FIG. 3 illustrates the timing diagram for a system with symmetric downlink and uplink data rate. As illustrated, the TX_ON signal generated by a controller shows the different time periods when data is transmitted on the medium at the master or slave side. It should be noted that while a TDD system need not require master and slave assignments, those master and slave assignments can help with initial training and loop timing.

In the present invention, while a signal is transmitted and during an inter-burst gap (IBG) period 300, the local receiver can be isolated from the line to avoid corruption of the receiver DSP state by echoes of the transmitter. The receiver DSP block 220 can be trained only during the time it is receiving data or idle signals from the other side.

Figure 4:
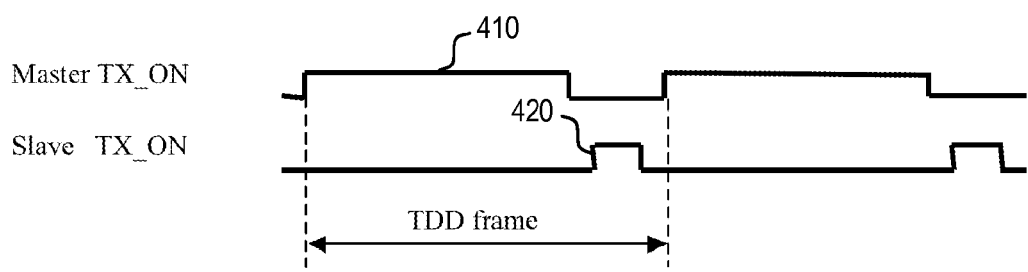
FIG. 4 illustrates transmitter activity with asymmetric downlink and uplink throughput.

FIG. 4 illustrates the TX_ON signal for a system with asymmetric downlink and uplink data rates. As illustrated, TX_ON signal 410 can be used to define a longer transmission period of the master, while TX_ON signal 420 can be used to define a relatively shorter transmission period of the slave. By this mechanism, more time may be assigned to the master or the slave in this case, effectively increasing throughput for either the downlink or the uplink. The use of asymmetric downlink and uplink data rates can be beneficial to those traffic profiles that are not symmetric.

For example, a traffic profile represented by a surveillance camera or streaming video traffic is not symmetrical as the amount of streaming video data in one direction would far exceed the amount of control data in the other direction. An application of asymmetric downlink and uplink data rates would therefore match the different levels of throughput in the two directions of transmission.

In one embodiment, the automatic adjustment of downlink and uplink rates can be used to generate improvements in latency and throughput. For example, if the downlink has no data to send, then the channel can be released to the uplink although, even though the downlink transmission period may not have completed yet. In this case, most of the bandwidth may be given to the downlink when downloading and to the uplink when uploading.

In enabling adaptive downlink and uplink data rates, the transmit time period can be actively tuned for both the uplink and the downlink in such a way that it provides maximum throughput and maintains latency requirements. For example, if the transmit FIFO buffer is empty in one direction, then control can be given to the other side of the link for transmission.

In one embodiment, a minimum and a maximum burst time can be used to ensure that the receiver DSP can maintain its status and track clock or channel variations. The maximum burst time can take into account the latency requirement as well. While the highest throughput can be achieved when the TDD frame is allowed to vary adaptively, in one embodiment, the TDD frame size can be considered constant while uplink and downlink transmission time periods are assigned adaptively.

Figure 5:
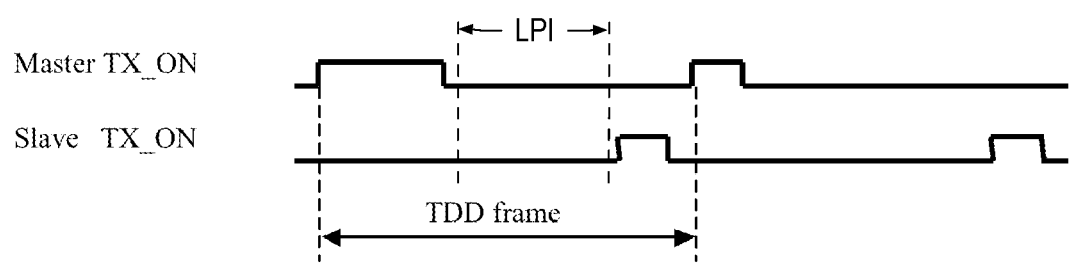
FIG. 5 illustrates transmitter activity with low power idle capability.

In one embodiment, power efficiency and unwanted radio emissions can also be improved if no signal is sent during system idle where no data is communicated. FIG. 5 illustrates the TX_ON signal for a system with Low Power Idle (LPI) capability. When there is no data to be sent, the line may be quiet in both directions for a period longer than the IBG as the LPI capability is leveraged.

In one embodiment, a periodic minimum transmission of data or idle signal can be considered to ensure that the receiver DSP status is maintained. It is a feature of the present invention that LPI can be considered and combined with symmetric, asymmetric or adaptive burst time allocations.

As an example system design, consider a standard 100 Mbps MII interface where CLK1 is 25 MHz and data is 4 bits wide. Also assume uplink and downlink transmission period durations are 220 μsec each and there is an IBG of 10 μsec. If CLK2 is greater than $25*2*(220+10)/220=52.27$ MHz and the FIFO buffer size is greater than $25/2*(10+220+10)=3$ KB, then full duplex connection at the MII interface at the standard 100 Mbps rate can be achieved.

For the same example above with CLK2 fixed at 52.27 MHz assume that the downlink transmission period duration is programmed to be 10 times larger than the uplink transmission period duration (e.g., 400 μsec versus 40 μsec). This allows for downlink throughput of up to $400/(460)*52.27$ MHz*4 bits/Hz=182 Mbps and uplink throughput of up to 18 Mbps. The clock at the MII interface or CLK1 may be adjusted to allow for this rate change if the MAC device allows for the intermediate clock speeds. It is also possible to select a fixed higher rate clock at the MII interface and use flow control to allow for variable and/or adjustable throughput at the downlink and uplink. IEEE standard PAUSE commands can also be used to provide flow control in this case.

Figure 6:
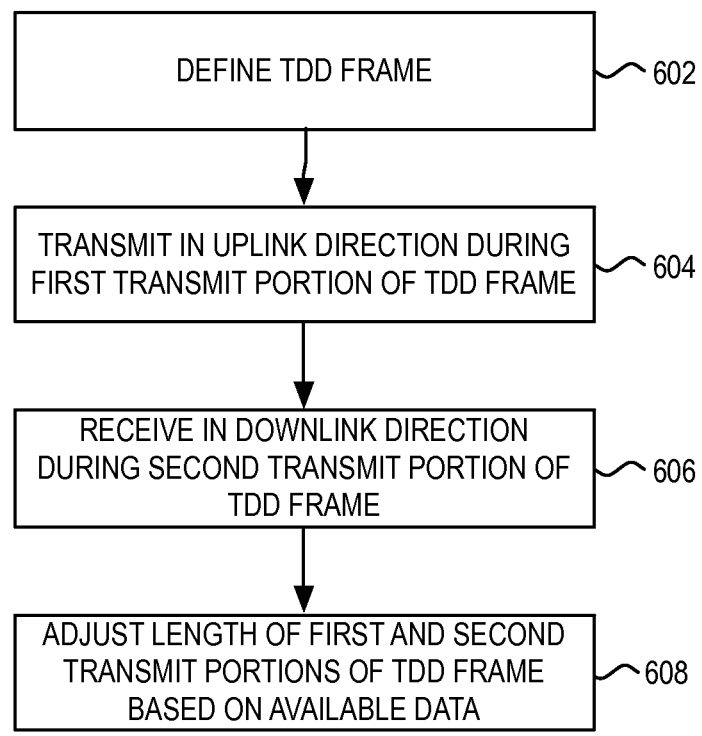
FIG. 6 illustrates a flowchart of a process of the present invention.

Having described an example application of the principles of the present invention, reference is now made to the flowchart of FIG. 6, which illustrates a process of the present invention. As illustrated, the process begins at step 602 where a TDD frame is defined. As noted above, in one embodiment, the TDD frame can be considered as a constant while uplink and downlink transmission periods vary within the TDD frame. Once defined, the TDD frame can describe uplink and downlink transmission periods to suit a given traffic profile on a network link. In various examples, the uplink and downlink transmission periods can be defined with equal time periods or unequal time periods.

At step 604, the transmitter in the uplink direction can be given transmission control based on a TX_ON signal generated by a controller in a first physical layer device during a first transmit portion of the TDD frame. This TX_ON signal can be generated by the controller in accordance with the TDD frame structure that was defined. Once the TX_ON signal indicates completion of the uplink transmission period, transmission control would effectively be given to a second physical layer device at the other end of the link, where a corresponding TX_ON signal is generated to indicate that transmission in the down link direction can proceed. At step 606, the first physical layer device would then receive data during the second transmit portion of the TDD frame.

In the present invention, the time periods corresponding to transmission in the uplink and downlink directions can be varied dynamically in the context of the TDD frame. As such, at step 608, the length of the first and second transmit portions can be adjusted based on the availability of data. For example, an indication that a given direction of transmission is having a negative impact on bandwidth and latency, can lead to an adjustment in the defined TDD structure as to the uplink and downlink transmission periods.

As would be appreciated, the particular mechanism used to initiate the adjustments can vary based on the granularity of desired in the adjustment mechanism. In one example, the adjustment can be made to respond to a particular FIFO level at a moment of time. In another example, the adjustment can be made to respond to a statistical measure of bandwidth and/or latency over a particular monitored period of time.

As has been described, the principles of the present invention can be applied to a single-pair or a multi-pair cable network. Moreover, the principles of the present invention can be used with twisted-pair cables, coaxial cables or fiber optic cables. Significantly, the principles of the present invention can be combined and used with various modulation techniques. Additionally, the principles of the present invention can be designed with predefined uplink and downlink throughputs or can be made programmable or even adaptive.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
    transmitting, by a first Ethernet physical layer device to a second Ethernet physical layer device via a single conductor pair network link, data during a first time period when the first Ethernet physical layer device has exclusive transmission use of the single conductor pair network link;
    receiving, by the first Ethernet physical layer device from the second Ethernet physical layer device via the single conductor pair network link, data that is transmitted by the second Ethernet physical layer device during a second time period when the second Ethernet physical layer device has exclusive transmission use of the single conductor pair network link, the second time period separated from the first time period by a first gap period, and a second gap period following the second time period, wherein the first and second time periods and the first and second gap periods define a repeating time division duplex frame; and
    increasing, by the first Ethernet physical layer device, a length of the first time period using a bandwidth measured over a monitored period of time, wherein a length of the second time period is decreased in response to the length of the first time period being increased.

2. The method of claim 1, wherein the first time period and the second time period are substantially equal lengths of time.

3. The method of claim 1, wherein the first time period and the second time period are different lengths of time.

4. The method of claim 1, further comprising entering, by the first Ethernet physical layer device, a low power idle mode during the first time period when the first Ethernet physical layer device has no data to send.

5. The method of claim 1, further comprising receiving, by the first Ethernet physical layer device, transmission control prior to the transmitting.

6. The method of claim 1, further comprising relinquishing, by the first Ethernet physical layer device, transmission control prior to the receiving.

7. An Ethernet physical layer device, comprising:
    a transmitter coupled to a single conductor pair cable, the transmitter configured to transmit data to a link partner during a first time period when the Ethernet physical layer device has exclusive transmission use of the single conductor pair cable;
    a receiver coupled to the single conductor pair cable, the receiver configured to receive data transmitted by the link partner during a second time period when the link partner has exclusive transmission use of the single conductor pair cable, the second time period separated from the first time period by a first gap period, and a second gap period following the second time period, wherein the first and second time periods and the first and second gap periods define a repeating time division duplex frame; and
    a controller configured to adjust a length of the first time period using a bandwidth measured over a monitored period of time,
    wherein the controller is further configured to increase the length of the first time period, and a length of the second time period being decreased in response to the length of the first time period being increased.

8. The Ethernet physical layer device of claim 7, wherein the first time period and the second time period are substantially equal lengths of time.

9. The Ethernet physical layer device of claim 7, wherein the first time period and the second time period are different lengths of time.

10. The Ethernet physical layer device of claim 7, wherein the controller shortens a length of the first time period if the Ethernet physical layer device has no data to send.

11. The Ethernet physical layer device of claim 7, wherein the Ethernet physical layer device enters a low power idle mode during the first time period if the Ethernet physical layer device has no data to send.

12. The Ethernet physical layer device of claim 7, further comprising a first-in-first-out buffer at a media access control layer interface, wherein a clock on a first side of the first-in-first-out buffer is faster than a second side of the first-in-first-out buffer.

13. The Ethernet physical layer device of claim 7, wherein the Ethernet physical layer device receives transmission control prior to transmission by the transmitter during the first time period.

14. The Ethernet physical layer device of claim 7, wherein the Ethernet physical layer device relinquishes transmission control prior to receiving by the receiver during the second time period.

15. A device operating in an Ethernet physical layer, comprising:
    a transmitter coupled to a single twisted wire pair, the transmitter configured to transmit data to a link partner during a first time period when the device has exclusive transmission use of the single twisted wire pair;
    a receiver coupled to the single twisted wire pair, the receiver configured to receive data transmitted by the link partner during a second time period when the link partner has exclusive transmission use of the single twisted wire pair, the second time period separated from the first time period by a first gap period, and a second gap period following the second time period, the first and second time periods and the first and second gap periods defining a repeating time division duplex frame; and
    a controller configured to increase a length of the first time period using a latency measured over a monitored period of time, wherein a length of the second time period is decreased in response to the length of the first time period being increased.

16. The device of claim 15, wherein the controller shortens a length of the first time period if the device has no data to send.

17. The device of claim 15, wherein the device enters a low power idle mode during the first time period if the device has no data to send.

18. The device of claim 15, wherein the transmitter transmits streaming video data and the receiver receives control data.

* * * * *